USO10532817B2

(12) United States Patent
Morgan

(10) Patent No.: US 10,532,817 B2
(45) Date of Patent: Jan. 14, 2020

(54) AIRCRAFT SEATING ARRANGEMENT WITH ENHANCED LAY FLAT POSITION SPACING

(71) Applicant: B/E AEROSPACE, INC., Wellington, FL (US)

(72) Inventor: Edward William Morgan, Winston-Salem, NC (US)

( * ) Notice: Subject to any disclaimer, the term of this patent is extended or adjusted under 35 U.S.C. 154(b) by 297 days.

(21) Appl. No.: 15/349,587

(22) Filed: Nov. 11, 2016

(65) Prior Publication Data
US 2017/0129611 A1    May 11, 2017

Related U.S. Application Data

(60) Provisional application No. 62/301,782, filed on Mar. 1, 2016, provisional application No. 62/253,853, filed on Nov. 11, 2015.

(51) Int. Cl.
*B64D 11/06*    (2006.01)

(52) U.S. Cl.
CPC .......... *B64D 11/0641* (2014.12); *B64D 11/06* (2013.01); *B64D 11/0601* (2014.12); *B64D 11/0604* (2014.12); *B64D 11/0605* (2014.12); *B64D 11/0606* (2014.12); *B64D 11/0643* (2014.12); *B64D 11/0646* (2014.12)

(58) Field of Classification Search
CPC ............ B64D 11/0641; B64D 11/0605; B64D 11/0604; B64D 11/0601; B64D 11/0606; B64D 11/0646; B64D 11/0643; B64D 11/06

See application file for complete search history.

(56) References Cited

U.S. PATENT DOCUMENTS

| 2012/0223186 A1 | 9/2012 | Henshaw |
| 2013/0032668 A1* | 2/2013 | Foucher ................. B64D 11/06 244/118.6 |
| 2014/0306500 A1* | 10/2014 | Dryburgh ............... B64D 11/06 297/232 |
| 2015/0166182 A1 | 6/2015 | Ducreux et al. |
| 2015/0166184 A1 | 6/2015 | Dryburgh et al. |
| 2017/0327232 A1* | 11/2017 | Morgan ................. B64D 11/06 |

FOREIGN PATENT DOCUMENTS

WO      2015083086 A1     6/2015

OTHER PUBLICATIONS

International Search Report received for PCT Patent Application No. PCT/US2016/061609, dated Jan. 2, 2017, 2 pages.

* cited by examiner

*Primary Examiner* — Valentina Xavier
(74) *Attorney, Agent, or Firm* — Clements Bernard PLLC

(57) ABSTRACT

A passenger seating arrangement including pairings of first and second laterally-adjacent seats, wherein the first and second seats are positioned at different angles relative to a longitudinal aircraft axis and the first and second seats recline to different vertical elevations such that a bed surface of the first seat in a lay flat configuration can overlap a portion of a bed surface of the second seat in a lay flat configuration to maximize seating density.

17 Claims, 5 Drawing Sheets

AIRCRAFT SEATING ARRANGEMENT WITH ENHANCED LAY FLAT POSITION SPACING

CROSS-REFERENCE TO RELATED APPLICATION

This application claims priority from U.S. Provisional Application No. 62/253,853 filed Nov. 11, 2015 and U.S. Application No. 62/301,782 filed Mar. 1, 2016, the contents of each of which are incorporated by reference herein.

TECHNICAL FIELD AND BACKGROUND OF THE INVENTION

The present invention relates generally to the field of passenger seating arrangements, and more particularly, to a seating arrangement including pairings of first and second laterally-adjacent seats, wherein the first and second seats are positioned at different angles relative to a longitudinal aircraft axis and the first and second seats recline to different vertical elevations such that a bed surface of the first seat in a lay flat configuration can overlap a portion of a bed surface of the second seat in a lay flat configuration to maximize seating density.

Business class seating occupies a product niche between first class premium seating where comfort and luxury is the overriding concern, and main cabin, coach seating where the number of seat occupants capable of being comfortably seated within a given area is a principal concern. In each case, regulations governing every aspect of seating design utilization must be complied with. In addition, passenger expectations must be considered and correlated with the level of seating offered in each area of the aircraft.

Lay or lie flat seating is becoming more prevalent in business class seating, where less space is available for each passenger than in first class, but more space than in coach class. For this reason, passenger density must be carefully managed in the business class area of the aircraft even as more comfort is offered to the business class passenger. Various seating arrangements have been developed for use in both first class and business class cabins that permit the seat occupant to rest in a prone or almost prone position, rather than simply reclining somewhat from the upright seat position. These arrangements include seats that are positioned at an oblique angle to the longitudinal axis of the aircraft, fore and aft staggered in relation to adjacent seats, angled in relation to adjacent seats and/or reversed in facing direction to adjacent seats, and the like.

This invention applies certain of these principles to a seating arrangement that also includes a minimal degree of overlap and vertical spacing between adjacent seats, resulting in an increase in passenger density without significantly changing the space provided to each passenger.

BRIEF SUMMARY OF THE INVENTION

It is therefore an object of the present invention to provide a business class passenger seating arrangement with enhanced lay flat position spacing.

It is a further object of the invention to provide a business class passenger seating arrangement that provides vertical spacing between adjacent passengers when in the lay flat seating configuration.

It is a further object of the invention to provide a business class passenger seating arrangement with vertical spacing between adjacent passengers when in the lay flat seating configuration and at the same level when the seats are in the upright and recline positions.

To achieve the foregoing and other objects and advantages, in one embodiment the present invention provides a passenger seating arrangement including a first seat having a longitudinal axis arranged at a first angle relative to a longitudinal axis of an aircraft, and a second seat laterally adjacent the first seat and having a longitudinal axis arranged at a second angle relative to the longitudinal axis of the aircraft, wherein the first and second seats are longitudinally staggered such that the first seat is positioned forward of the second seat by an amount less than a full length dimension of the first seat, and wherein a bed surface of the first seat in a lay flat configuration is at a first vertical position different from a second vertical position of a bed surface of the second seat in a lay flat configuration.

In a further embodiment, a portion of the bed surface of the first seat in the lay flat configuration may overlap a portion of the bed surface of the second seat in the lay flat configuration.

In a further embodiment, each of the first and second seats may include a seat bottom, a seatback, and a legrest.

In a further embodiment, the seatback of the first seat in the lay flat configuration may overlap a portion of the seatback of the second seat in the lay flat configuration.

In a further embodiment, the first angle and the second angle may be different.

In a further embodiment, the first angle may be parallel to the longitudinal axis of the aircraft and the second angle may be from greater than 0 degrees to less than 45 degrees relative to the longitudinal axis of the aircraft.

In a further embodiment, the first and second angles may be different and the second angle may be from 5 degrees to 15 degrees relative to the longitudinal axis of the aircraft.

In a further embodiment, the first and second seats may be both forward facing or both rearward facing.

In a further embodiment, the seating arrangement may include a first privacy shell surrounding a seatback end of the first seat, and a second privacy shell surrounding a seatback end of the second seat, the first privacy shell comprising a vertical wall separating the first and second seats.

In a further embodiment, the second seat may include an armrest recessed into the first privacy shell.

In a further embodiment, the second seat may include a footwell recessed into the first privacy shell.

In a further embodiment, the first seat may be adapted to be positioned laterally-adjacent a fuselage wall of the aircraft and the second seat may be adapted to be positioned laterally-adjacent a longitudinal aisle, and wherein the first seat may be accessed through a lateral aisle positioned forward of the second seat and branching from the longitudinal aisle, and the second seat may be accessed directly from the longitudinal aisle.

According to another embodiment, the present invention provides a passenger seating arrangement for an aircraft including a plurality of seating groups each including a first seat and a second seat, the first seat having a longitudinal axis arranged at a first angle relative to a longitudinal axis of an aircraft and the second seat laterally adjacent the first seat and having a longitudinal axis arranged at a second angle relative to the longitudinal axis of the aircraft, wherein the first and second angles are different, wherein the first and second seats are longitudinally staggered such that the first seat is positioned forward of the second seat by an amount less than a full length dimension of the first seat, and wherein a bed surface of the first seat in a lay flat configuration is at a first vertical elevation different from a second vertical elevation of a bed surface of the second seat in a lay flat configuration.

In a further embodiment, the plurality of seating groups may be arranged into a port side column, a starboard side column, and a center column, wherein the port side column is spaced from the center column by a first longitudinal aisle, the starboard side column is spaced from the center column by a second longitudinal aisle, the first seat of each of the plurality of seating groups is spaced apart from a respective one of the first and second longitudinal aisles, and the second seat of each of the plurality of seating groups is laterally-adjacent a respective one of the first and second longitudinal aisles.

In a further embodiment, the second seat of each of the plurality of seating groups may be accessed directly from a respective one of the first and second longitudinal aisles, and the first seat of each of the plurality of seating groups may be accessed through a lateral aisle branching from a respective one of the first and second longitudinal aisles.

In a further embodiment, the center column may include a first column including the plurality of seating groups positioned laterally-adjacent a second column including the plurality of seating groups such that the first seats of the first column are positioned laterally-adjacent the first seats of the second column.

In a further embodiment, a portion of the bed surface of the first seat in the lay flat configuration may overlap a portion of the bed surface of the second seat in the lay flat configuration.

In a further embodiment, the first angle may be parallel to the longitudinal axis of the aircraft and the second angle may be from greater than 0 degrees to less than 45 degrees relative to the longitudinal axis of the aircraft.

In a further embodiment, the seating arrangement may include a first privacy shell surrounding a seatback end of the first seat, and a second privacy shell surrounding a seatback end of the second seat, the first privacy shell including a vertical wall separating the first and second seats.

In a further embodiment, the second seat may include an armrest and a footwell each recessed into the first privacy shell.

Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
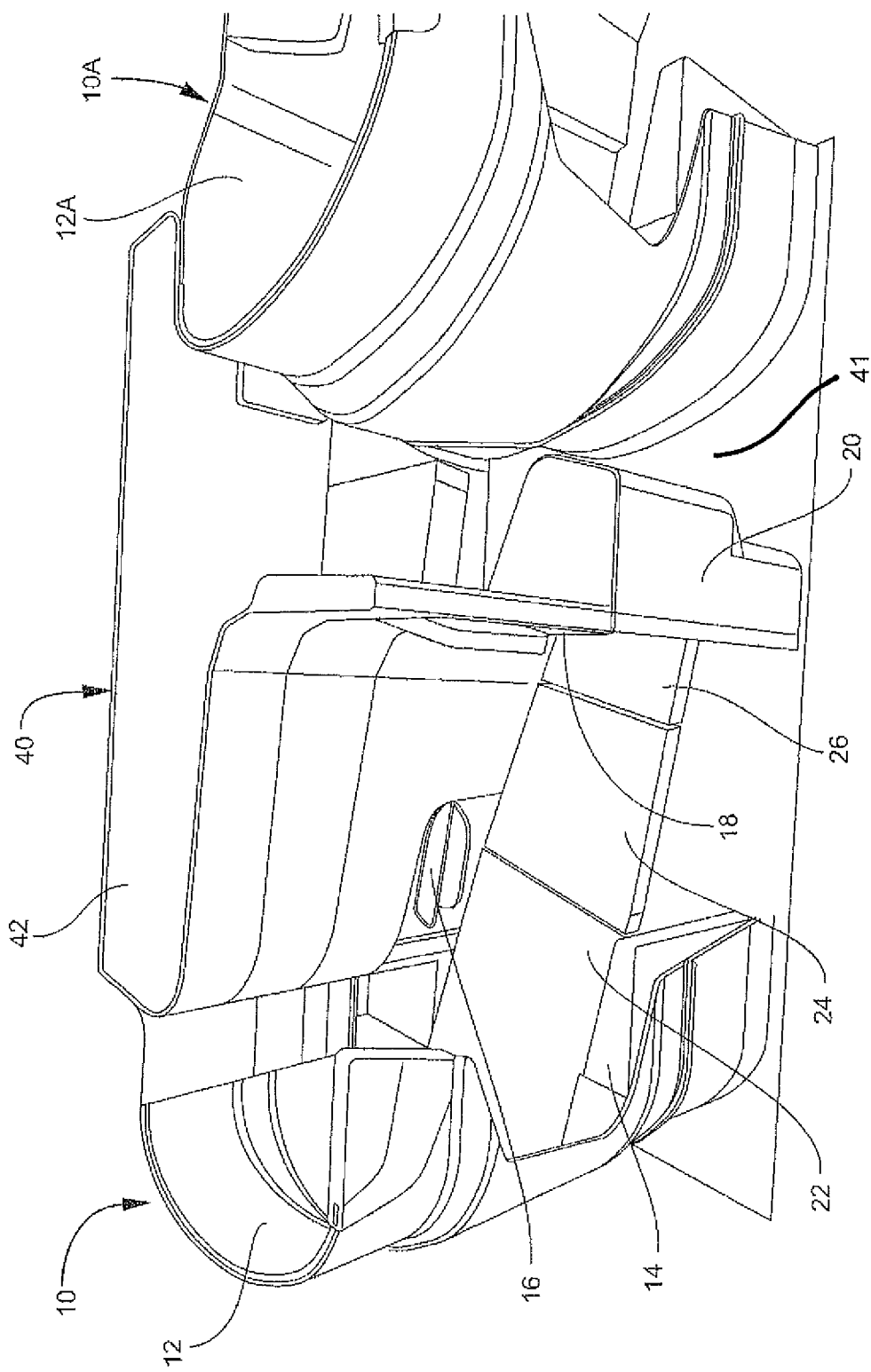
FIG. 1 is a side perspective view of a passenger seating arrangement according to an embodiment of the invention showing first and second seats each in a lay flat configuration.
Figure 2:
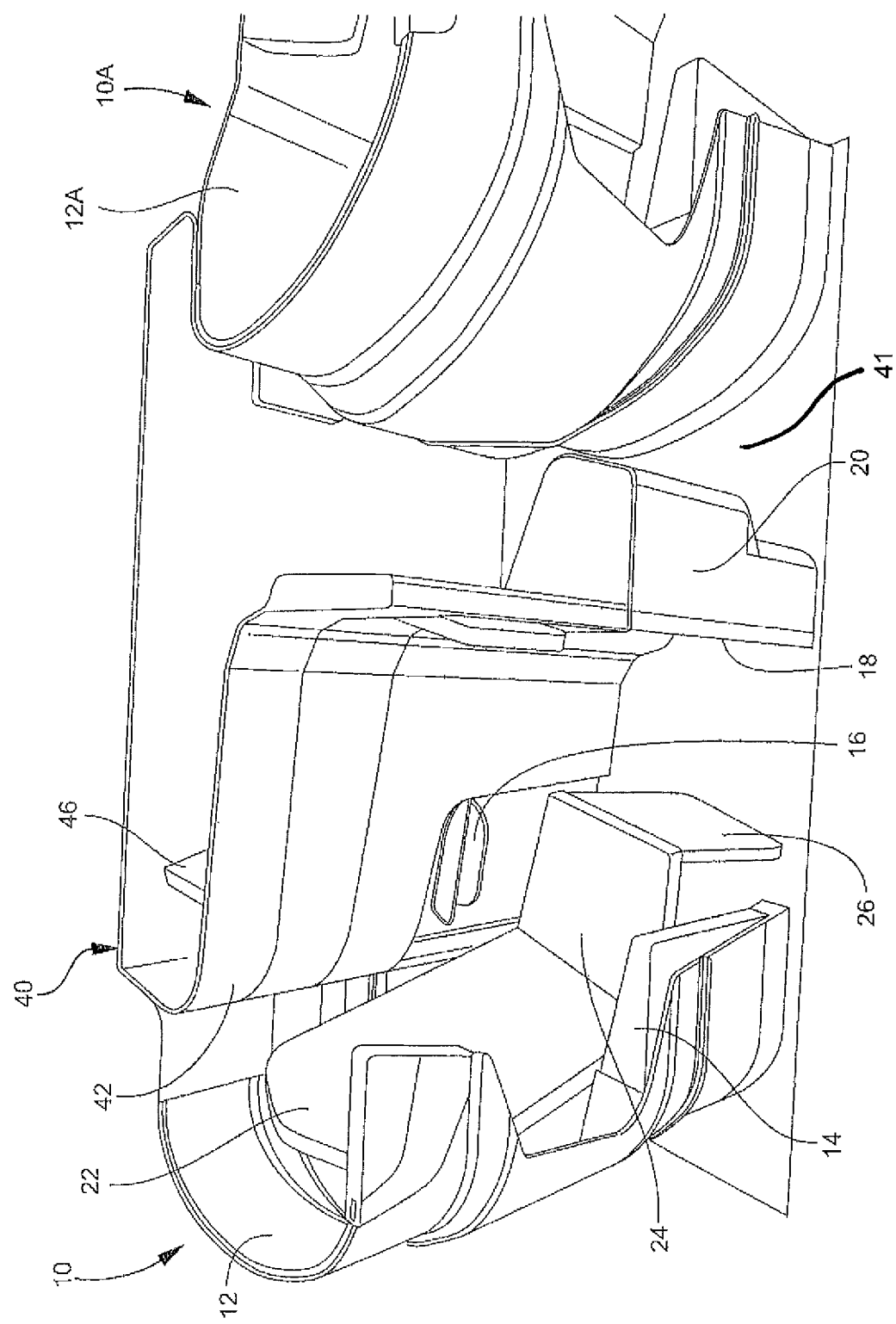
FIG. 2 is a side perspective view of the seating arrangement showing the first and second seats each in an upright seating configuration.

Referring now to the drawings, FIGS. 1 and 2 show respective lay flat and upright sitting positions of laterally-adjacent first and second seats 40, 10. First seat 40 is adapted to be positioned within a dedicated suite located apart from a longitudinal aisle, for example, adjacent a fuselage wall or another like first seat in a center column of the aircraft. Second seat 10 is adapted to positioned adjacent a longitudinal aisle. First seat 40 is accessed through a lateral aisle, while second seat 10 is accessed directly from an adjacent longitudinal aisle. The first and second seats 40, 10 may be of the type found in a business or premium class seating section of an airliner or other commercial conveyance.

As apparent in FIGS. 1 and 2, first and second seats 40, 10 are positioned laterally-adjacent, but are longitudinally staggered such that first seat 40 is positioned forward of second seat 10. The amount of forward positioning can vary; however, in a preferred embodiment the amount of forward positioning is less than a full length dimension of the first seat in the lay flat configuration. The degree of offset may vary depending on the size of the business class cabin and the extent to which an increase in passenger seating density in the business class cabin is considered necessary or desirable. Both seats 40, 10 can be forward facing or rearward facing.

Each of the first and second seats 40, 10 generally includes a seat back 22, a seat bottom 24, and a legrest 26 which, in the lay flat configuration shown in FIG. 1, collectively form a planar bed surface. The first and second seats 40, 10 are each fully reclinable, meaning that each seat is capable of adjusting between an upright sitting position for taxi, take-off, and landing, and a lay flat position forming a horizontal bed surface for sleeping. To achieve the lay flat seating configuration, the seatback 22 may recline to horizontal, the angle of the seat bottom 24 may move to horizontal, and the legrest 26 may deploy from a position against the front of the seat to a horizontal position. In the lay flat configuration, the top supporting surfaces of the seat may be coplanar and horizontal. Intermediate seating configurations between full upright and full lay flat can be achieved, and the legrest can be adjusted independent of other seat components.

Each seat may further be equipped with a right and left armrests 14, 16. A first fixed privacy shell 42 surrounds the seatback end of the first seat 40. The first privacy shell 42 includes a vertical wall portion that runs alongside one side of the first seat 40, thereby separating the first seat 40 from the second seat 10 and providing a degree of privacy therebetween. The left armrest 16 of the second seat 10 can be recessed into the first privacy shell 42, thereby allowing the first and second seats 40, 10 to be positioned closer together than if the left armrest 16 were located outside of the first privacy shell 42. The first privacy shell can be arranged as shown to curve around the seatback of the first seat 40, extend alongside the first seat 40, and ultimately curve in a direction meeting the longitudinal aisle.

A footwell 20 associated with the second seat 10 may be recessed into the first privacy shell 42 near the longitudinal aisle to further maximize space and seating density. The footwell 20 permits the feet and lower legs of the passenger seated in the second seat 10 to extend forward and be supported when the second seat 10 is in the lay flat configuration. A convenience/entertainment center 18 can be located above the footwell 20, and can include one or more of a video monitor, seat controls, storage pocket, etc. The second seat 10 can also include a footwell (see FIG. 4 at 44).

A second fixed privacy shell 12 associated with the second seat 10 substantially surrounds the seatback end of the second seat to provide privacy behind the seat and along the longitudinal aisle. The second privacy shell 12 also includes a vertical wall portion. A second like privacy shell 12A is spaced apart from the footwell 20 in the first privacy shell 42 and substantially surrounds a seatback end of another like second seat 10A. A lateral aisle 41 is formed between the first privacy shell 42 and the second privacy shell 12A for gaining access from the longitudinal aisle to the first seat 40.

Figures 3, 4:
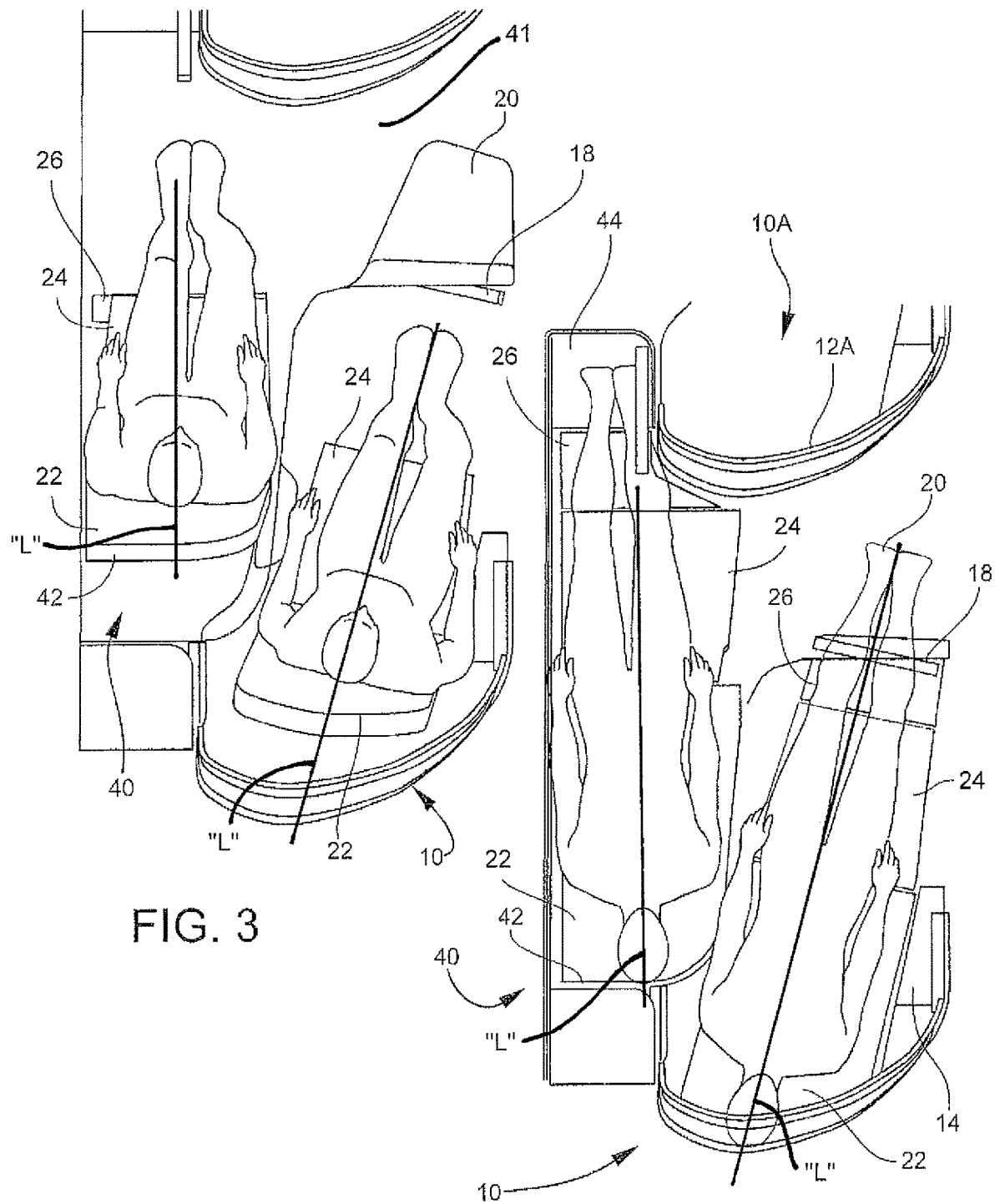
FIG. 3 is a top plan view of the seating arrangement showing the first and second seats each in an upright seating configuration.
FIG. 4 is a top plan view of the seating arrangement showing the first and second seats each in a lay flat seating configuration.

Referring to FIGS. 3 and 4, the respective upright and lay flat seating configurations of the first and second seats 40, 10 are shown. The first seat 40 has a longitudinal axis "L" arranged at a first angle relative to a longitudinal axis of the aircraft. The second seat 10 laterally-adjacent the first seat 40 has a longitudinal axis "L" arranged at a second angle relative to the longitudinal axis of the aircraft. The first and second angles are preferably different. The first angle can be parallel to the longitudinal axis of the aircraft and the second angle can be from greater than 0 degrees to less than 45 degrees relative to the longitudinal axis of the aircraft. In an alternative embodiment, the first angle can be from 0 degrees to 5 degrees relative to the longitudinal axis, and the second angle can be from 5 degrees to 15 degrees relative to the longitudinal axis of the aircraft. Each of the first and second angles can range from 0 degrees to 45 degrees, so long as the two angles are different.

Viewed from above, it can be seen that the first and second seats 40, 10 are longitudinally staggered such that the first seat 40 is positioned forward of the second seat 10 by an amount less than a full length dimension of the first seat 40. The bed surface of the first seat 40 in the lay flat configuration is at a first vertical position different from (i.e., above) a second vertical position of the bed surface of the second seat 10 in the lay flat configuration. As best shown in FIG. 4, a portion of the bed surface of the first seat 40 in the lay flat configuration overlaps a portion of the bed surface of the second seat 10 in the lay flat configuration. For example, the seatback 22 of the first seat 40 in the lay flat configuration overlaps a portion of the seatback or left armrest of the second seat 10 in the lay flat configuration.

Figure 5:
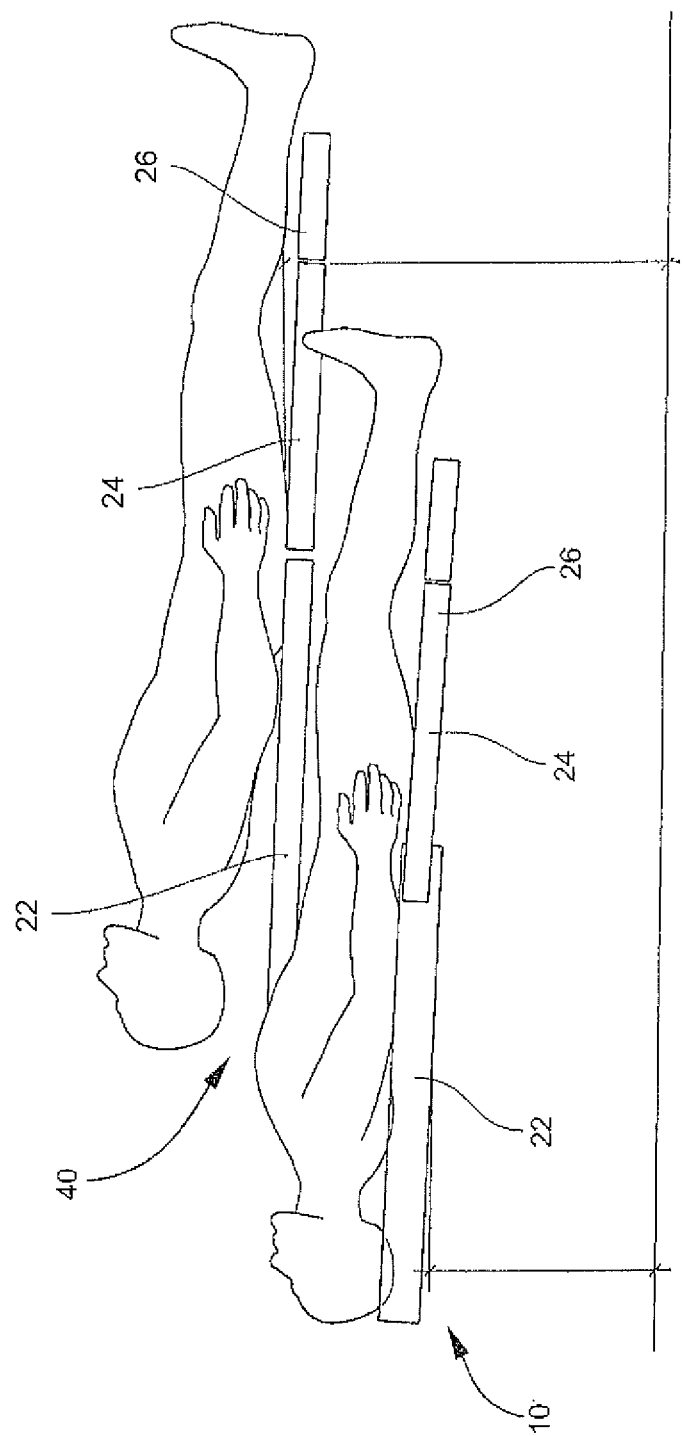
FIG. 5 is a side elevation view of the first and second seats each in a lay flat configuration showing the different vertical positions of the two bed surfaces.

Referring to FIG. 5, the vertical and staggered fore and aft orientations of seats 10 and 40 are shown. The vertical offset creates additional space for both passengers that would not be available if the bed surfaces were at the same vertical position/elevation. The degree of overlap can be several centimeters above the passenger lying on the lower of the two seats. Preferably, the two passengers in the first and second seats 40, 10 sit at the same height above deck level when seated in the fully upright sitting position. The vertical offset in the lay flat configuration is created by provision of a different recline linkage or vertical adjustment mechanism in each of the first and second seats 40, 10. The vertical offset in the lay flat positions can be achieved by raising first seat 40 relative to second seat 10, lowering second seat 10 in relation to first seat 40, or raising first seat 40 and lowering second seat 10.

Figure 6:
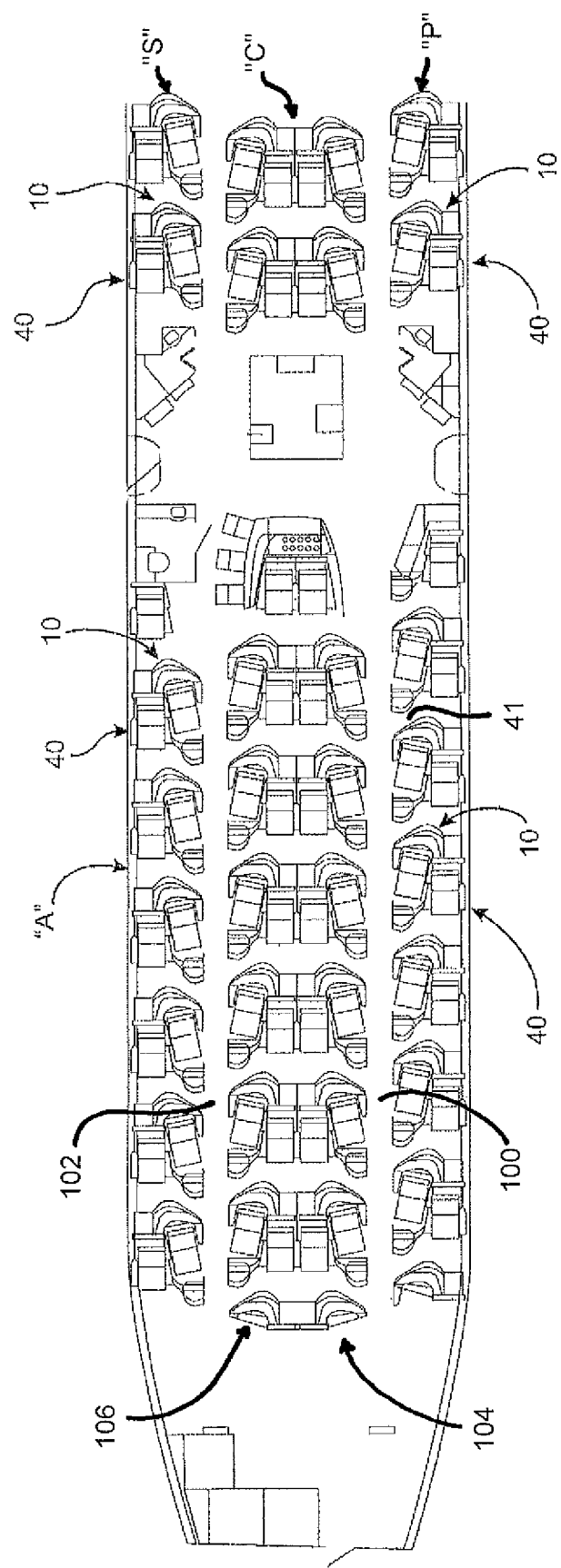
FIG. 6 is a floorplan view of an aircraft passenger seating arrangement including pairs of laterally-adjacent passenger seats arranged into various columns separated by longitudinal aisles.

Referring to FIG. 6, an aircraft cabin "A" floorplan is shown illustrating one preferred cabin arrangement including a plurality of pairings of first seat 40 and second seat 10 as described above. In this particular arrangement, eight seats total including four first seats 40 and four second seats 10 extend laterally across the full width of the cabin. Pairings of first and second seats 40, 10 are arranged to form a port side column "P", a starboard side column "S", and a center column "C".

The port side column "P" is spaced from the center column "C" by a first longitudinal aisle 100, and the starboard side column "S" is spaced from the center column "C" by a second longitudinal aisle 102. The first seat 40 of each of the plurality of seating groups is spaced apart from a respective one of the first and second longitudinal aisles 100, 102, and the second seat 10 of each of the plurality of seating groups is laterally-adjacent a respective one of the first and second longitudinal aisles 100, 102. In this seating arrangement, the second seat 10 of each of the plurality of seating groups is accessed directly from a respective one of the first and second longitudinal aisles 100, 102, and the first seat 40 of each of the plurality of seating groups is accessed through a lateral aisle 41 branching from a respective one of the first and second longitudinal aisles 100, 102.

The center column "C" as shown includes a first column 104 including the plurality of seating groups positioned laterally-adjacent a second column 106 including the plurality of seating groups such that the first seats 40 of the first column 104 are positioned laterally-adjacent the first seats 40 of the second column.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A passenger seating arrangement, comprising:
   a first seat having a longitudinal axis arranged at a first angle relative to a longitudinal axis of an aircraft;
   a second seat laterally adjacent the first seat and having a longitudinal axis arranged at a second angle relative to the longitudinal axis of the aircraft; and a privacy wall positioned between the first and second seats;

wherein the first and second seats are longitudinally staggered such that the first seat is positioned forward of the second seat by an amount less than a full length dimension of the first seat;

wherein a bed surface of the first seat in a lay flat configuration is at a first vertical position different from a second vertical position of a bed surface of the second seat in a lay flat configuration;

wherein an armrest of the second seat is recessed into the privacy wall; and wherein a seatback of the first seat in the lay flat configuration overlaps a portion of a seatback or armrest of the second seat in the lay flat configuration.

2. The passenger seating arrangement according to claim 1, wherein a portion of the bed surface of the first seat in the lay flat configuration overlaps a portion of the bed surface of the second seat in the lay flat configuration.

3. The passenger seating arrangement according to claim 1, wherein each of the first and second seats comprises a seat bottom, the seatback, and a legrest.

4. The passenger seating arrangement according to claim 1, wherein the first angle and the second angle are different.

5. The passenger seating arrangement according to claim 1, wherein the first angle is parallel to the longitudinal axis of the aircraft and the second angle is from greater than 0 degrees to less than 45 degrees relative to the longitudinal axis of the aircraft.

6. The passenger seating arrangement according to claim 1, wherein the first and second angles are different and the second angle is from 5 degrees to 15 degrees relative to the longitudinal axis of the aircraft.

7. The passenger seating arrangement according to claim 1, wherein the first and second seats are both forward facing or both rearward facing.

8. The passenger seating arrangement according to claim 1, further comprising a first privacy shell surrounding a seatback end of the first seat, and a second privacy shell surrounding a seatback end of the second seat, and wherein the first privacy shell includes the privacy wall positioned between the first and second seats.

9. The passenger seating arrangement according to claim 8, wherein the second seat comprises a footwell recessed into the first privacy shell.

10. The passenger seating arrangement according to claim 8, wherein the first seat is adapted to be positioned laterally-adjacent a fuselage wall of the aircraft and the second seat is adapted to be positioned laterally-adjacent a longitudinal aisle, and wherein the first seat is accessed through a lateral aisle positioned forward of the second seat and branching from the longitudinal aisle, and the second seat is accessed directly from the longitudinal aisle.

11. A passenger seating arrangement for an aircraft, comprising:

a plurality of seating groups each including a first seat and a second seat, the first seat having a longitudinal axis arranged at a first angle relative to a longitudinal axis of an aircraft and the second seat laterally adjacent the first seat and having a longitudinal axis arranged at a second angle relative to the longitudinal axis of the aircraft, and a privacy wall positioned between the first and second seats;

wherein the first angle and the second angle are different;

wherein the first and second seats are longitudinally staggered such that the first seat is positioned forward of the second seat by an amount less than a full length dimension of the first seat;

wherein a bed surface of the first seat in a lay flat configuration is at a first vertical position different from a second vertical position of a bed surface of the second seat in a lay flat configuration;

wherein an armrest of each second seat is recessed into its respective privacy wall; and wherein a seatback of each first seat in the lay flat configuration overlaps a portion of a seatback or armrest of its respective second seat in the lay flat configuration.

12. The passenger seating arrangement according to claim 11, wherein the plurality of seating groups are arranged into a port side column, a starboard side column, and a center column, wherein the port side column is spaced from the center column by a first longitudinal aisle, the starboard side column is spaced from the center column by a second longitudinal aisle, the first seat of each of the plurality of seating groups is spaced apart from a respective one of the first and second longitudinal aisles, and the second seat of each of the plurality of seating groups is laterally-adjacent a respective one of the first and second longitudinal aisles.

13. The passenger seating arrangement according to claim 12, wherein the second seat of each of the plurality of seating groups is accessed directly from a respective one of the first and second longitudinal aisles, and the first seat of each of the plurality of seating groups is accessed through a lateral aisle branching from a respective one of the first and second longitudinal aisles.

14. The passenger seating arrangement according to claim 11, wherein the center column comprises a first column comprising the plurality of seating groups positioned laterally-adjacent a second column comprising the plurality of seating groups such that the first seats of the first column are positioned laterally-adjacent the first seats of the second column.

15. The passenger seating arrangement according to claim 11, wherein a portion of the bed surface of the first seat in the lay flat configuration overlaps a portion of the bed surface of the second seat in the lay flat configuration.

16. The passenger seating arrangement according to claim 11, wherein the first angle is parallel to the longitudinal axis of the aircraft and the second angle is from greater than 0 degrees to less than 45 degrees relative to the longitudinal axis of the aircraft.

17. The passenger seating arrangement according to claim 11, further comprising a first privacy shell surrounding a seatback end of the first seat, and a second privacy shell surrounding a seatback end of the second seat, wherein the first privacy shell includes the privacy wall separating the first and second seats.

* * * * *